(12) United States Patent
Dieckmann et al.

(10) Patent No.: US 12,344,218 B2
(45) Date of Patent: Jul. 1, 2025

(54) METHOD FOR CONTROLLING THE DECELERATION OF A VEHICLE AND BRAKING SYSTEM THEREFOR

(71) Applicant: ZF CV Systems Global GmbH, Bern (CH)

(72) Inventors: Thomas Dieckmann, Pattensen (DE); Florian Schwagmeyer, Uetze-Dollbergen (DE)

(73) Assignee: ZF CV Systems Global GmbH, Bern (CH)

( * ) Notice: Subject to any disclaimer, the term of this patent is extended or adjusted under 35 U.S.C. 154(b) by 210 days.

(21) Appl. No.: 17/833,321

(22) Filed: Jun. 6, 2022

(65) Prior Publication Data

US 2022/0297647 A1 Sep. 22, 2022

Related U.S. Application Data

(63) Continuation of application No. PCT/EP2020/084046, filed on Dec. 1, 2020.

(30) Foreign Application Priority Data

Dec. 6, 2019 (DE) .................. 10 2019 133 373.3

(51) Int. Cl.
  *B60T 8/1766* (2006.01)
  *B60T 8/17* (2006.01)
  (Continued)

(52) U.S. Cl.
  CPC .......... *B60T 8/1766* (2013.01); *B60T 8/1708* (2013.01); *B60T 8/268* (2013.01); *B60T 13/665* (2013.01)

(58) Field of Classification Search
  None
  See application file for complete search history.

(56) References Cited

U.S. PATENT DOCUMENTS

| 4,850,650 A | 7/1989 | Eckert et al. |
| 5,588,718 A | 12/1996 | Winner et al. |

(Continued)

FOREIGN PATENT DOCUMENTS

| CN | 100427342 C | * 10/2008 | ............ B60T 8/1766 |
| CN | 104010896 A | 8/2014 | |

(Continued)

OTHER PUBLICATIONS

International Search Report of the European Patent Office dated Feb. 10, 2021 for international application PCT/EP2020/084046 on which this application is based.

(Continued)

*Primary Examiner* — Melanie Torres Williams
(74) *Attorney, Agent, or Firm* — Walter Ottesen, P.A.

(57) ABSTRACT

The disclosure is directed to a method for controlling the deceleration of a vehicle, wherein the vehicle includes a central control unit, a first brake circuit for a rear axle and a second brake circuit for a front axle. In the method, in the event of an electronically requested deceleration request below a predefined deceleration threshold value, only the brake circuit for the axle, from the rear axle and the front axle, that allows the finest gradation in the pressure change for substantially continuous, jolt-free manipulation of the deceleration is activated by the central control unit and remains activated as long as the predefined deceleration threshold value is not exceeded by the deceleration request. The disclosure is also directed to a braking system and to a vehicle.

9 Claims, 5 Drawing Sheets

(51) Int. Cl.
*B60T 8/26* (2006.01)
*B60T 13/66* (2006.01)

(56) References Cited

U.S. PATENT DOCUMENTS

| | | |
|---|---|---|
| 2009/0273231 A1 | 11/2009 | Knechtges |
| 2015/0046057 A1 | 2/2015 | Lauser et al. |
| 2016/0236662 A1 | 8/2016 | Neu et al. |
| 2017/0210365 A1 | 7/2017 | Luelfing et al. |
| 2018/0072287 A1 | 3/2018 | Boethel et al. |
| 2018/0170330 A1 | 6/2018 | Wieder et al. |
| 2018/0222460 A1 | 8/2018 | Owen et al. |
| 2018/0345928 A1 | 12/2018 | Broyles |
| 2019/0152459 A1 | 5/2019 | Dieckmann et al. |
| 2020/0172063 A1 | 6/2020 | Dieckmann et al. |
| 2021/0370898 A1 | 12/2021 | Eckert |

FOREIGN PATENT DOCUMENTS

| | | | | |
|---|---|---|---|---|
| CN | 105705390 A | | 6/2016 | |
| CN | 106458196 A | | 2/2017 | |
| CN | 107531220 A | | 1/2018 | |
| CN | 107750214 A | | 3/2018 | |
| CN | 108883755 A | | 11/2018 | |
| CN | 109789859 A | | 5/2019 | |
| DE | 43 40 467 A1 | | 6/1995 | |
| DE | 19712732 A1 | * | 10/1998 | ............. B60T 8/268 |
| DE | 10131323 A1 | * | 5/2002 | ................ B60T 8/00 |
| DE | 10 2005 023 364 A1 | | 11/2006 | |
| DE | 102005021492 A1 | * | 11/2006 | ................ B60T 7/12 |
| DE | 10 2006 034 357 A1 | | 1/2008 | |
| DE | 10 2017 005 816 A1 | | 12/2018 | |
| EP | 1 730 006 A1 | | 12/2006 | |

OTHER PUBLICATIONS

Translation and Written Opinion of the International Searching Authority dated Feb. 10, 2021 for international application PCT/EP2020/084046 on which this application is based.

Partial English translation and first Office action of the Chinese Patent Office dated Apr. 29, 2024 in corresponding Chinese application No. 202080082080.3.

English translation and Second Office action of the Chinese Patent Office dated Aug. 3, 2024 for corresponding Chinese application 202080082080.3.

* cited by examiner

METHOD FOR CONTROLLING THE DECELERATION OF A VEHICLE AND BRAKING SYSTEM THEREFOR

CROSS REFERENCE TO RELATED APPLICATIONS

This application is a continuation application of international patent application PCT/EP2020/084046, filed Dec. 1, 2020 designating the United States and claiming priority from German application 10 2019 133 373.3, filed Dec. 6, 2019, and the entire content of both applications is incorporated herein by reference.

TECHNICAL FIELD

The disclosure relates to a method for controlling the deceleration of a vehicle, in particular a commercial vehicle, having a front axle and a rear axle, in which, in the event of an electronic deceleration request below a predefined deceleration threshold value, only a brake circuit for the front axle or the rear axle is activated, that is, a brake pressure is generated only at the selected axle and the vehicle is slowed down only via that axle. The disclosure relates further to a corresponding braking system and to a vehicle having the corresponding braking system.

SUMMARY

It is an object of the disclosure to provide a method for controlling deceleration of a vehicle.

One aspect of the disclosure relates to a method for controlling the deceleration of a vehicle, in particular a commercial vehicle, wherein the vehicle includes a central control unit, a first brake circuit for a rear axle and a second brake circuit for a front axle, wherein, in the event of an electronically requested deceleration request below a predefined deceleration threshold value, only the brake circuit for the axle, from the rear axle and the front axle, that allows the finest gradation in a pressure change for substantially continuous, jerk-free manipulation of the deceleration is activated by the central control unit and preferably remains activated as long as the deceleration request does not exceed the predefined deceleration threshold value.

The fact that the vehicle has a front axle does not mean that the vehicle includes only a single front axle; rather, the meaning encompasses the case where the vehicle has more than a single front axle, that is, two, three or more front axles. The same is true for the rear axle, where a rear axle likewise does not mean a single rear axle.

If the vehicle has more than a single front axle and/or rear axle, the first brake circuit can serve all the rear axles and the second brake circuit can serve all the front axles. In the case of a plurality of front axles and/or rear axles, each of the front axles and/or rear axles can include its own brake circuit, or a plurality of the axles are slowed down by a common brake circuit. Accordingly, the axle with the finest gradation in a pressure change for substantially continuous, jerk-free manipulation of the deceleration can be a single axle of the plurality of front axles or rear axles, or the corresponding manipulation of the deceleration is effected by a brake circuit at two or more axles or at all the axles.

In the method, the other axle, from the rear axle and the front axle, whose brake circuit is not connected in the event of the deceleration request below the deceleration threshold value remains largely pressure-free. Within the scope of this application, the expression "largely pressure-free" also includes the inputting of the system pressure into the brake circuit.

In other words, in the event of the mentioned deceleration request, only the brake circuit for the front axle(s) or the rear axle(s) that allows gentle and/or substantially jerk-free slowing down is activated.

The brake force can be controlled at one of the rear axle and the front axle via an ABS architecture and at the other of the rear axle (HA) and the front axle (VA) by an axle modulator. That is, the ABS architecture or the axle modulator generates at corresponding brakes a brake force which acts on the axle and thus slows down or negatively accelerates the vehicle.

In the case of the ABS architecture, compressed air in the brake circuit is fed via a valve, for example a relay valve, to ABS-SMV units, which in known manner act on the brakes in question and thereby slow down the wheels and, in the event of wheel locking, reduce the brake pressure in order to end the locking immediately. Preferably, an ABS-SMV unit is provided for each wheel and acts on the brake for the wheel in question, whereby the corresponding axle of the front axle and rear axle is slowed down.

In the case of the axle modulator, the compressed air of the corresponding brake circuit is delivered to a valve assembly which includes at least one relay valve and/or at least one ABS-SMV unit and/or at least one solenoid valve. The axle modulator generates a brake force which acts via corresponding brakes on the wheels driven by the axle.

Preferably, only the brake circuit of the axle whose deceleration is controlled via the available brake force of the axle modulator is activated by the central control unit, since the axle modulator is better suited for allowing substantially jerk-free slowing down of the vehicle.

Preferably, the axle, from the front axle and the rear axle, with the finer gradation of the pressure change is activated by the central control unit when the electronic deceleration request lies in a range between 0 m/sec$^2$ and 3 m/sec$^2$, preferably between 0 m/sec$^2$ and 2.5 m/sec$^2$ and particularly preferably between 0 m/sec$^2$ and 2 m/sec$^2$. In addition, the lower limit, instead of being at 0 m/sec$^2$, can also be at 0.5, 0.75 or 1 m/sec$^2$ or even higher or between those values. That is, the method is of advantage in particular in a situation in which the speed of the vehicle is to be slowed in the long term, or when driving in a line at low speed, for example.

If the deceleration request at the start of the braking operation is above a deceleration threshold value of greater than 3 m/sec$^2$, preferably greater than 2.5 m/sec$^2$ and particularly preferably greater than 2 m/sec$^2$, or if the deceleration request increases above that value in the course of the braking operation, the brake circuit for the hitherto unbraked axle can automatically additionally be activated by the central control unit.

Alternatively or additionally, a pressure threshold value can be specified for the first, more finely variable vehicle axle and, when this pressure threshold value is exceeded, the second, more coarsely variable vehicle axle is also used for the deceleration.

Finally, the time at which the second, more coarsely variable vehicle axle is used for decelerating the vehicle can be determined in dependence on a differential slip of the two axles. In this application, differential slip refers to a difference, based on the speed of the front axle, between the axle speeds of the two vehicle axles. The differential slip is usually given by the formula $$s = (v\_VA - v\_HA)/v\_VA$$

wherein v_VA is the speed of the front axle and v_HA is the speed of the rear axle.

Since, because of different axle loads, different friction usages and thus different brake slips are achieved at the same brake pressure, the differential slip provides a good measure of friction usage.

That is, in order to ensure vehicle stability and comfort on connection of the second, more coarsely variable vehicle axle for decelerating the vehicle, each of the preceding criteria (deceleration threshold value, pressure threshold value, differential slip) can be used individually, or any desired combination of two of the mentioned criteria or all of the three mentioned criteria together can be used in order to determine the time at which the second vehicle axle is connected.

On connection of the additionally activated brake circuit, a pressure jump can occur in the braking system, which is preferably compensated for by reducing the pressure in the brake circuit with the finer gradation.

Preferably, the deceleration of the rear axle is effected by the brake force generated by the axle modulator, so that the rear axle is the axle with which the vehicle can be slowed down substantially without jerking in the event of the mentioned deceleration requests.

The method can be so configured that, regardless of the magnitude of the electronic deceleration request, that is, even if the deceleration request lies in the range between 0 m/sec$^2$ and 3 m/sec$^2$, preferably between 0 m/sec$^2$ and 2.5 m/sec$^2$ and particularly preferably between 0 m/sec$^2$ and 2 m/sec$^2$, the first brake circuit and the second brake circuit are activated by the central control unit if a traveling speed of the vehicle at the time of the electronic deceleration request is above a predefined speed threshold value. In addition, the lower limit, instead of being at 0 m/sec$^2$, can also be at 0.5, 0.75 or 1 m/sec$^2$ or even higher or between those values.

A second aspect of the disclosure relates to a braking system for a vehicle, preferably a commercial vehicle, having a central control unit, an actuating element for the braking system having a brake valve, preferably a digital brake valve, a first brake circuit for a rear axle and a second brake circuit for a front axle, wherein the central electronic control unit, in dependence on a traveling speed of the vehicle and/or a deceleration request by the electronic request for deceleration, activates and maintains at the corresponding system conditions only the first or second brake circuit which has the finest gradation in the pressure change for substantially continuous, jerk-free manipulation of the deceleration. That is, there is first connected only the brake circuit in which a brake force acting on the axle can be modulated in the finest possible way, so that the vehicle is braked in particular without jerking and is slowed down continuously and without jerking. The braking system is preferably in the form of a pneumatic braking system, in particular in the form of an electronically controllable pneumatic braking system.

Activation of only the one axle can be maintained until the vehicle comes to a standstill or the electronic request for deceleration exceeds a predefined deceleration threshold value or the traveling speed of the vehicle changes in such a way that the electronic control unit automatically causes the brake circuit that was initially not activated to be connected.

If the vehicle includes more than a single front axle and/or rear axle, the first brake circuit can serve all the rear axles and the second brake circuit can serve all the front axles. In the case of a plurality of front axles and/or rear axles, each of the front axles and/or each of the rear axles can include its own brake circuit, or a plurality of the axles are slowed down by a common brake circuit. Accordingly, the axle with the finest gradation in a pressure change for substantially continuous, jerk-free manipulation of the deceleration can be a single axle of the plurality of front axles or rear axles, or the corresponding manipulation of the deceleration is effected by a brake circuit at two or more axles or at all the axles.

The first or second brake circuit that is not activated by the central control unit can be at least substantially pressure-free, so that no brake force acts on this axle.

The first brake circuit or the second brake circuit can include or have an ABS architecture, while the other of the first brake circuit and the second brake circuit can include an axle modulator.

Preferably, the central control unit, in dependence on the traveling speed of the vehicle and/or the deceleration request, in particular by an electronic deceleration request, activates only the brake circuit of the axle, from the front axle and the rear axle, that controls the deceleration of the axle via the brake force of the axle modulator.

Preferably, a maximum permissible deceleration request in the event of which only the axle with the finest pressure gradation is activated lies between 0 m/sec$^2$ and 3 m/sec$^2$, preferably between 0 m/sec$^2$ and 2.5 m/sec$^2$ and particularly preferably between 0 m/sec$^2$ and 2 m/sec$^2$. In addition, the lower limit, instead of being at 0 m/sec$^2$, can also be at 0.5, 0.75 or 1 m/sec$^2$ or even higher or between those values. If the maximum permissible deceleration request is exceeded, the electronic control unit can automatically additionally activate the brake circuit with the ABS architecture. If the traveling speed of the vehicle is above a predefined speed threshold value, the central control unit can activate the first brake circuit and the second brake circuit at each deceleration request, that is, regardless of the value of the level of the deceleration request. The speed threshold value can be, for example, 60 km/h or 20 km/h or less, or can have any other value.

On connection of the axle with the ABS architecture, a pressure jump can occur in the brake circuit with the ABS architecture, which is compensated for by the central control unit by a pressure change in the brake circuit with the axle modulator. This pressure change can be different each time the brake circuit with the ABS architecture is connected, depending on the extent of the pressure jump.

The axle modulator can include at least one relay valve and/or ABS-SMV and/or 3/2-way solenoid valve.

A third aspect of the disclosure relates to a commercial vehicle having a braking system according to the second aspect, suitable for carrying out a method according to the first aspect. That is, the third aspect relates to a commercial vehicle which can execute or carries out a method for controlling the deceleration thereof.

It will be appreciated that features which have been described only in connection with the method can also advantageously refine the braking system and, conversely, features which have been described only for the braking system can advantageously refine the method.

BRIEF DESCRIPTION OF THE DRAWINGS

The invention will now be described with reference to the drawings wherein.

DESCRIPTION OF THE PREFERRED EMBODIMENTS

Figure 1:
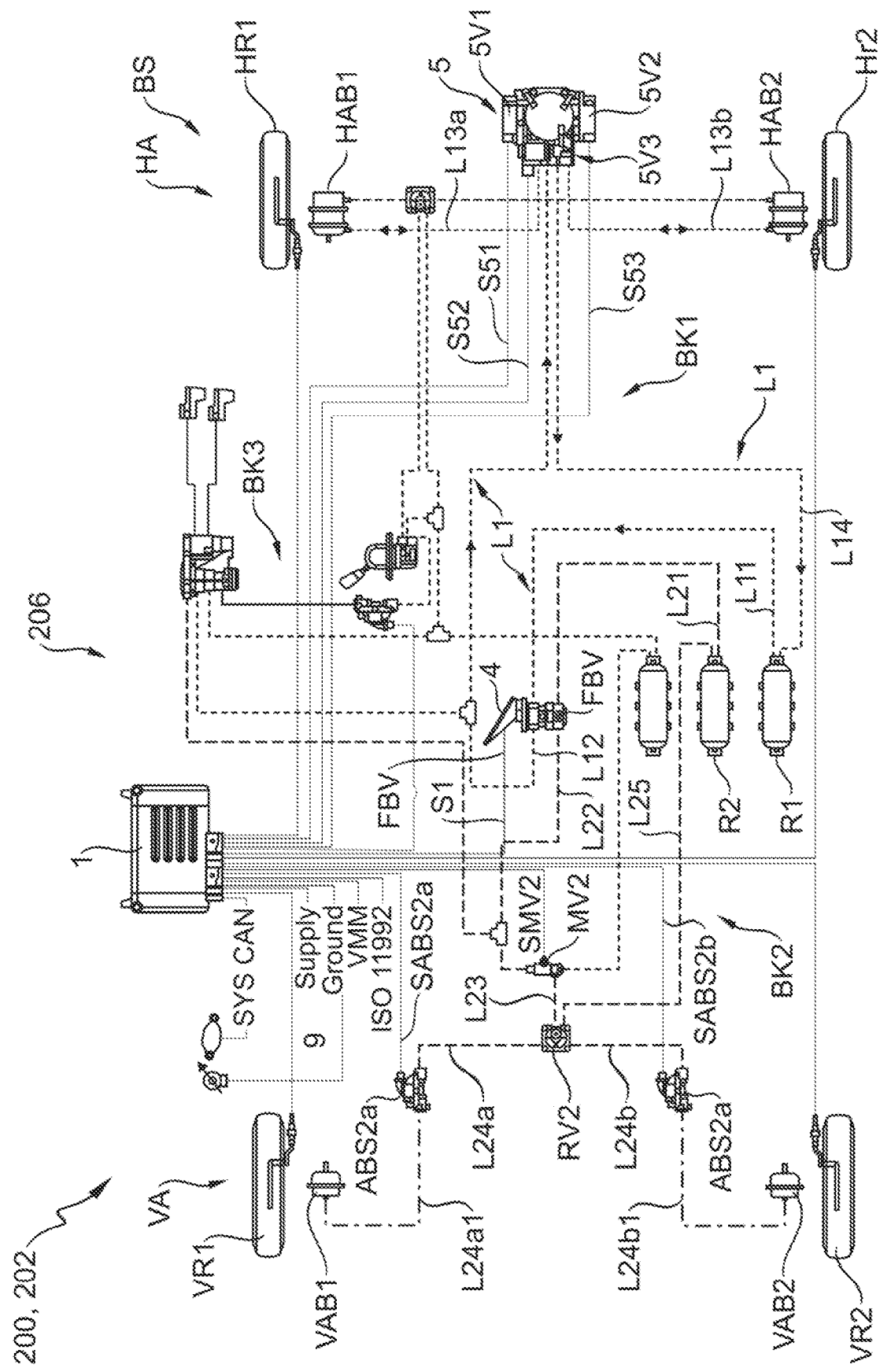
FIG. 1: shows a schematic structure of a braking system.

FIG. 1 shows, in a diagram, the structure of a braking system 206 for a vehicle 200 or commercial vehicle 202 having at least one front axle VA and at least one rear axle HA and optionally a trailer which is pulled by the commercial vehicle 202.

For this purpose, the braking system 206 of the embodiment includes a brake circuit BK1 for the rear axle HA, a brake circuit BK2 for the front axle VA and a brake circuit BK3 which can slow down a trailer connected to the commercial vehicle 202 and is associated with a parking brake for the commercial vehicle 202. The brake circuit BK3 will not be discussed in the following text since it is not important for the method and the braking system 206 adapted therefor.

The braking system 206 further includes an electronic control unit (ECU) 1 for activating and controlling the brake circuits BK1, BK2 and BK3.

The brake circuit BK1 for the rear axle HA includes a reservoir R1 for a compressed fluid, preferably compressed air, and a line system L1 which connects the reservoir R1 to the rear axle HA, or to an axle modulator 5 for applying a brake pressure to the brakes HAB1, HAB2 of the rear axle HA in order to generate a brake force. The line system L1 includes a first line section L11 which connects the reservoir R1 to a brake pedal 4, or to a foot brake valve FBV which is actuated directly or indirectly via the brake pedal 4. In the embodiment, the foot brake valve FBV is connected via a control line S1 to the control unit 1, so that the foot brake valve FBV can be read out electronically in the embodiment.

The foot brake valve FBV can connect the first line section L11 to a second line section L12 which leads directly to the axle modulator 5.

The axle modulator 5 can include various valves, for example relay valves 5V1 and/or ABS valves 5V2 and/or pulsed or continuous pressure control valves/pressure regulating valves 5V3, et cetera. Each of the valves 5V1, 5V2, 5V3 is connected to the control unit 1 via a control line S51, S52, S53. The valves 5V1, 5V2, 5V3 can be activated and controlled individually by the control unit 1. That is, for generating a brake pressure at the rear axle HA, only one of the valves 5V1, 5V2, 5V3 or a plurality of the valves 5V1, 5V2, 5V3 or all of the valves 5V1, 5V2, 5V3 can be active. Switching of the valves 5V1, 5V2, 5V3 by the control unit 1 can be determined, for example, in dependence on the current traveling speed of the commercial vehicle 202, actuation of the foot brake valve FBV (pressure and/or speed which act(s) on the brake pedal), which signals a magnitude of a deceleration request, for example full braking or only gentle deceleration such as, for example, in a line of traffic, and other parameters, such as outside temperature, total weight of the commercial vehicle, et cetera. From the axle modulator 5, the brake fluid is transmitted via a first third line section L13a to the brake HAB1 of the first rear wheel HR1 and via a second third line section L13b to the brake HAB2 of the second rear wheel HR2.

Via the axle modulator 5 with the combination of the different valves 5V1, 5V2, 5V3, in particular the brake force acting on the brakes HAB1, HAB2 of the rear axle HA can be manipulated, that is, increased, in small steps, so that the rear axle HA, depending on the deceleration request, can be slowed down by the control unit 1 substantially without jerking. This is advantageous for the ride comfort of the passengers and protects the equipment, such as the tires and suspension, for example, which leads to longer service lives and thus saves costs.

In the axle modulator 5, in the event of a deceleration request that is below a predefined limit value, the pressure coming from the electronic foot brake valve FBV and present at least at one of the valves 5V1, 5V2, 5V3 can be reduced by the control unit 1 and the reduced pressure can be guided via the first and second line sections L13a, L13b to the brake HAB1, HAB2 of the corresponding rear wheel HR1, HR2 in order to slow down the vehicle 200 gently under certain conditions.

In the braking system shown, a valve V1 which connects the first brake circuit BK1 to the third brake circuit BK3 for an optional trailer is provided in the first line system L1.

The second brake circuit BK2 for the front axle VA includes a reservoir R2 for a brake fluid, preferably compressed air. The second brake circuit BK2 includes a line system L2 having a first line section L21, which connects a reservoir R2 to the electronic foot brake valve FBV, and a second line section L22, which conveys the brake fluid from the foot brake valve FBV to a valve, in the braking system 206 shown to a solenoid valve MV2, and a third line section L23, which conveys the brake fluid from the solenoid valve MV2 to a relay valve RV2. From the relay valve RV2, the brake fluid is conveyed via a first fourth line section L24a to an ABS valve ABS2a for the brake VAB1 and via a second fourth line section L24b to an ABS valve ABS2b.

From the ABS valves ABS2a and ABS2b, the brake fluid is further conveyed via further line sections L24a1 and L24b1 to the brakes VAB1 and VAB2, respectively, whereby the wheels VR1 and VR2 of the front axle VA are slowed down.

In the braking system 206 shown, a valve V2 which connects the second brake circuit BK2 to a further third brake circuit BK3 is provided in the second line system L2. The further third brake circuit BK3 is irrelevant for the disclosure and therefore will not be described further.

In the event of a deceleration request via the brake pedal 4, the foot brake valve FBV can connect only the line sections L11 and L12 of the first brake circuit BK1 to one another or, in the event of a correspondingly greater deceleration request, it can connect the line sections L11 and L12 of the first brake circuit BK1 and the line sections L21 and L22 of the second brake circuit BK2 to one another. If only the first brake circuit BK1 of the rear axle HA is activated by the foot brake valve FBV, either one or more or all of the valves B1V, B2V, B3V can be activated in dependence on the deceleration request initially and in the course of the braking operation as a whole. The switching or connecting of the valves B1V, B2V, B3V is thereby so controlled by the control unit 1 that the commercial vehicle 202 is slowed down gently, in particular without jerking. The braking operation, for example when joining a slow-moving line of traffic, can last until the speed of the line has been reached and can then be carried out repeatedly while traveling in the line, or can end when the commercial vehicle 202 comes to a standstill.

If the deceleration that can be generated by the first brake circuit BK1 of the rear axle HA is not sufficient to slow down the commercial vehicle 202 gently over a remaining distance, the second brake circuit BK2 of the front axle VA is connected by corresponding actuation of the brake pedal 4 via the foot brake valve FBV, so that the wheels HR1, HR2 of the rear axle HA and the wheels VR1, VR2 of the front axle VA are then actively slowed down via the respective brake HAB1, HAB2 or VAB1, VAB2.

The solenoid valve MV2 is connected to the control unit 1 via a signal line SMV2, and the ABS valves ABS2a and ABS2b are each connected to the control unit 1 via a respective signal line SABS2a or SABS2b. The control unit 1 is a central control unit for the braking system 206 which, via corresponding signal lines, which are not labeled, can additionally receive signals from and/or transmit signals to all the wheels HR1, HR2, VR1, VR2, an electronic stability control system (ESC module) 8 and further functional parts of the braking system 206 in order to carry out a method of the disclosure, with which the vehicle 200 or commercial vehicle 202 can be slowed down gently and/or without jerking. The signals can be measurement signals, which represent a measured speed, temperature, et cetera, or switching or actuating signals, which control the opening and closing of the mentioned valves, for example. The signal lines can be physical lines, which are part of a cable harness, but they are preferably radio links which transmit the information wirelessly.

Figure 2:
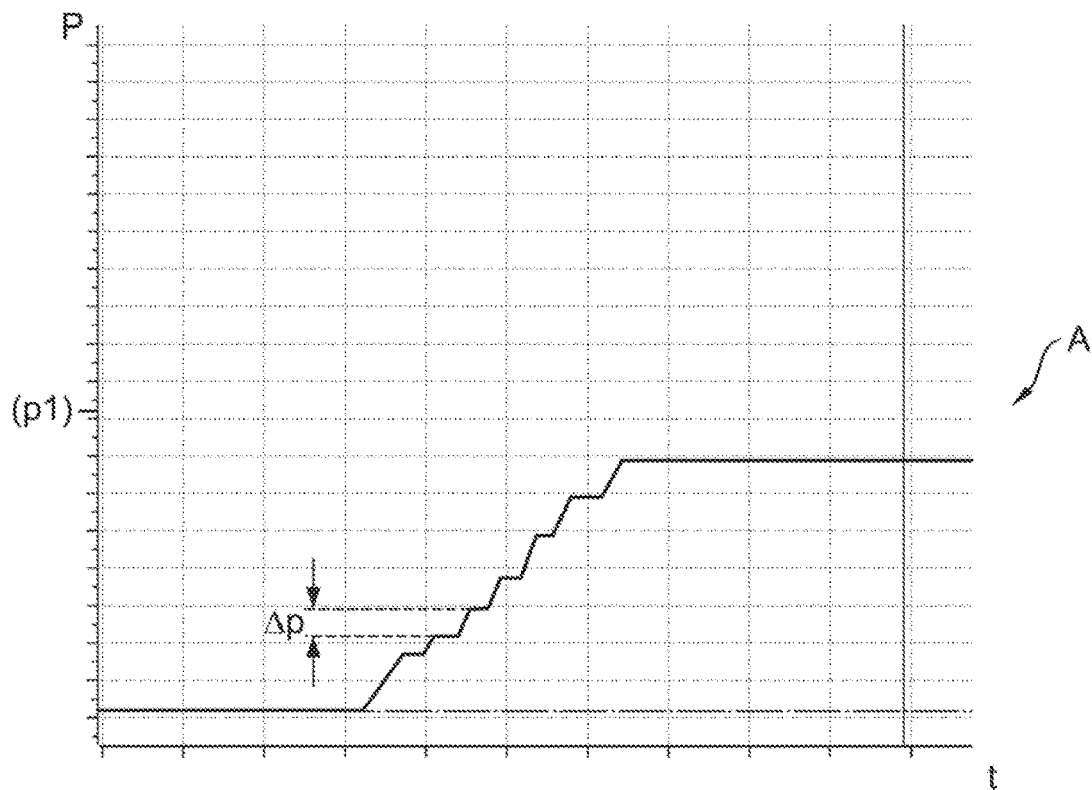
FIG. 2: shows a first brake pressure profile.

FIG. 2 shows a first brake pressure profile A in a diagram which shows a pressure change over time, wherein the time in seconds is plotted on the X-axis and the pressure is plotted on the Y-axis. The brake pressure profile A of FIG. 2 can be the brake pressure valve of a vehicle 200 or commercial vehicle 202 on a front axle VA or rear axle HA and can be generated, for example, by an ABS valve or an ABS architecture ABS2a, ABS2b.

Figure 3:
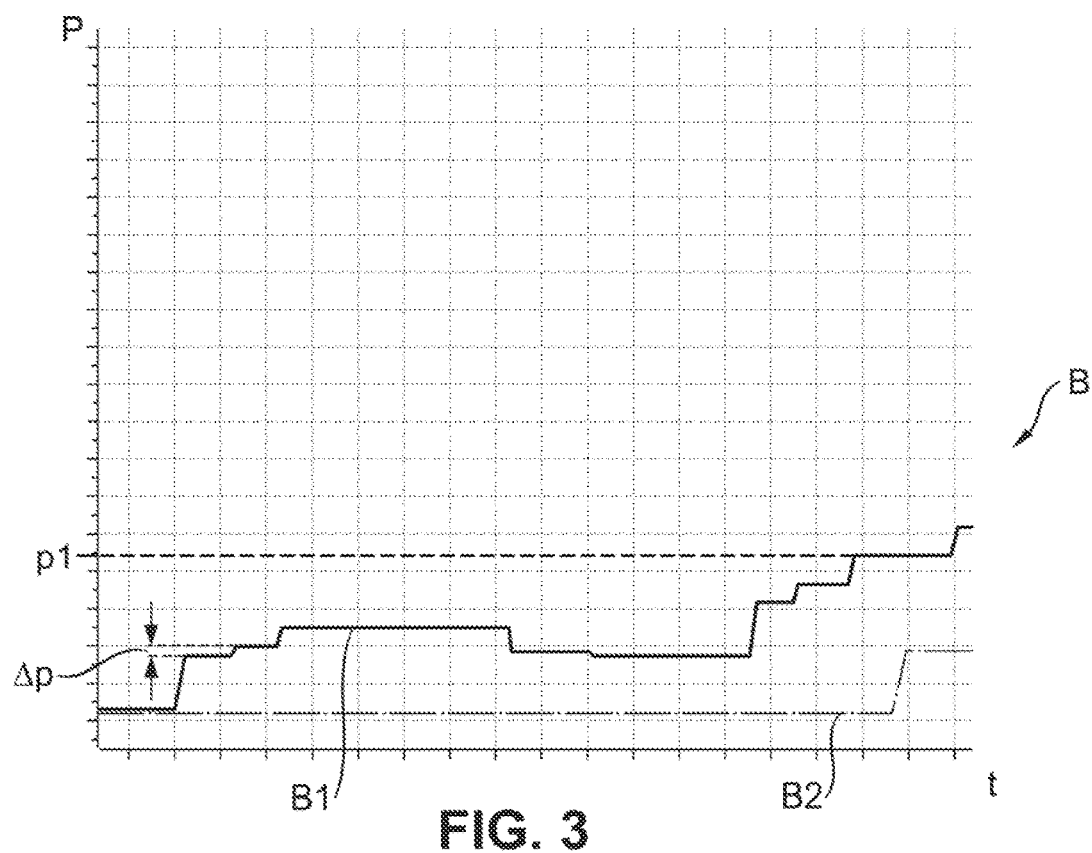
FIG. 3: shows a second brake pressure profile.

FIG. 3 shows a second brake pressure profile B, likewise in the diagram view of FIG. 2. The brake pressure profile B is generated by valves which are switched in succession. Firstly, a first valve is switched, which generates the brake pressure partial profile B1 in which the brake pressure is increased gently so that substantially jerk-free deceleration can be produced. As soon as the brake pressure generated via the first valve reaches a predefined maximum value p1, the control unit 1 connects a second valve, for example, which can be of a different type to that of the first valve, so that the brake pressure partial profile B1 is then supplemented by the brake pressure partial profile B2, the two brake pressure partial profiles B1, B2 form the brake pressure profile B. The brake pressure profile B can be generated, for example, by an axle modulator 5 with more than one valve 5V1, 5V2, 5V3. The brake pressure profile of FIG. 3 can be, for example, the brake pressure profile of an axle, the rear axle HA or the front axle VA, of a vehicle 200 or commercial vehicle 202.

Figure 4:
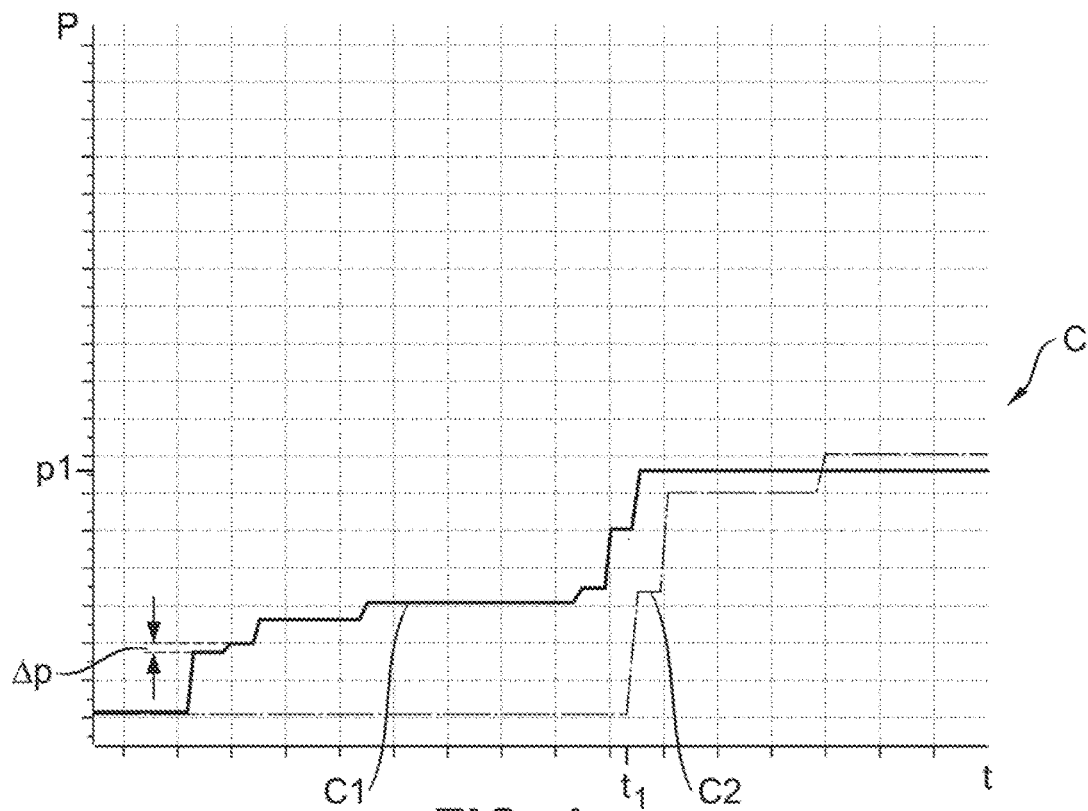
FIG. 4: shows a third brake pressure profile.

FIG. 4 shows a third brake pressure profile C, which is formed by overlaying a first brake pressure partial profile C1, as is generated, for example, by the ABS architecture ABS2a, ABS2b and is shown in FIG. 2, with a second brake pressure partial profile C2, for example an axle modulator 5, as is shown by way of example in FIG. 3. The commercial vehicle 202 is first slowed down in a first step substantially without jerking at only one axle from the rear axle HA and the front axle VA until the brake pressure has increased to a value p1. When this pressure p1 is reached, a current deceleration request is above a predefined deceleration threshold value, so that the other axle, from the rear axle HA and the front axle VA, is additionally activated in order to slow down the commercial vehicle 202 in accordance with the deceleration request. When the other axle is connected in this way, a pressure jump, which is not shown, that is, an increase in the pressure in the braking system 206 above a desired value for the deceleration request, can occur, which is compensated for by the central control unit 1 lowering a pressure in the brake circuit with the brake pressure partial profile C1 (see in this connection FIG. 6).

Figure 5:
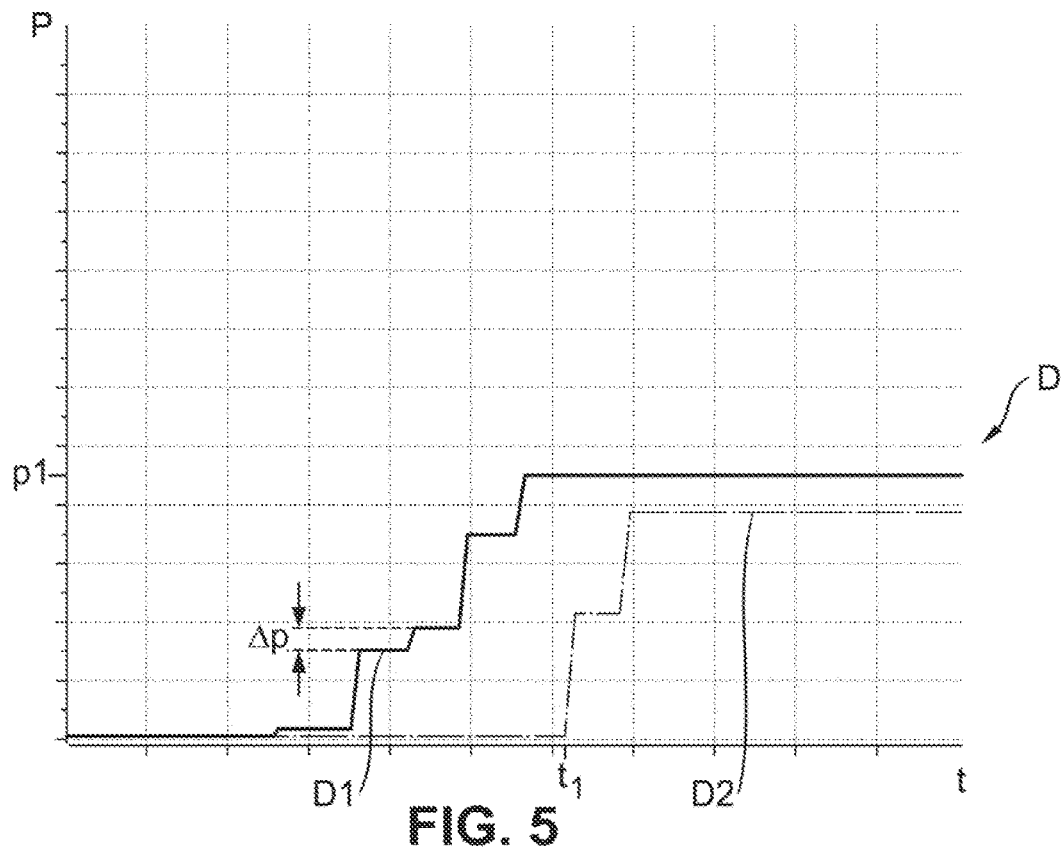
FIG. 5: shows a fourth brake pressure profile.

FIG. 5 is an enlarged detail view of a brake pressure profile D having a brake pressure partial profile D1 of a first valve and a brake pressure partial profile D2 of a second valve. Owing to a traveling speed of the commercial vehicle 202 and/or owing to a deceleration request of the commercial vehicle 202 that is above a predefined limit value or threshold value, braking is first carried out at the axle, from the rear axle HA and the front axle VA, that has the ABS structure ABS2a ABS2b. This initial braking or slowing down is shown in the brake pressure partial profile D1. Shortly thereafter, the further axle from the rear axle HA and the front axle VA is additionally slowed down. The first valve can be formed, for example, by an ABS architecture ABS2a, ABS2b, and the second valve can be formed by the axle modulator 5. As soon as the brake pressure p of the first brake pressure partial profile D1 reaches or exceeds the pressure threshold value p1, the second valve is connected in order thus to brake the other axle. This takes place at time t1.

Figure 6:
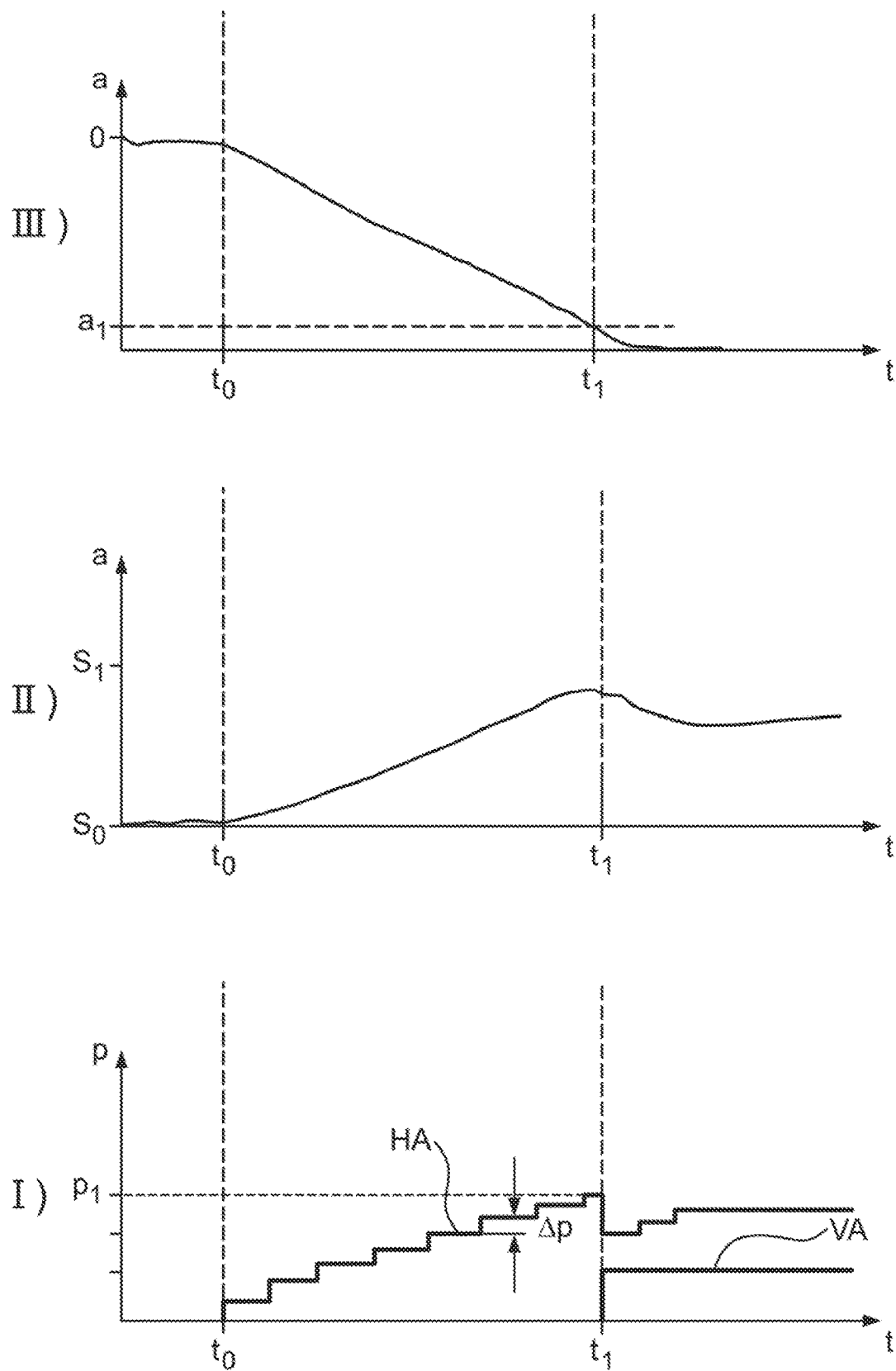
FIG. 6: shows diagrams for the pressure threshold value, the differential slip threshold value and the deceleration threshold value over time in a first embodiment; and, FIG. 7: shows diagrams for the pressure threshold value, the differential slip threshold value and the deceleration threshold value over time in a second embodiment.

FIG. 6 shows in diagram I) the change over time of a pressure build-up at the rear axle HA up to the pressure threshold value $p_1$, at which the front axle VA is automatically connected in order to assist with the deceleration a of the vehicle 200.

The rear axle HA allows substantially continuous, jerk-free deceleration a of the vehicle 200, since the pressure build-up at the brakes HAB1, HAB2 takes place in small steps, that is, a large number of small pressure differences Δp occur, which are not perceived by the driver of the vehicle 200. When the pressure threshold p1 is reached in the brake circuit BK1, the second brake circuit BK2, which acts on the front axle VA of the vehicle 200, is automatically activated at time t1.

$t_0$ on the time axis t indicates the time at which the driver of the vehicle 200 initiates the deceleration a by actuating the brake pedal 4, so that the vehicle is initially slowed down only via the rear axle HA. At time $t_1$, the front axle VA is automatically activated for further slowing down of the vehicle 200, so that the vehicle 200 is then slowed down by the rear axle HA and the front axle VA.

In the variant shown here, not only is the front axle VA connected at time $t_1$ but the pressure p at the rear axle HA is at the same time reduced by an amount which preferably corresponds approximately to the amount connected at the front axle VA. This is advantageous in order to avoid a pressure jump that is too pronounced and thus sudden slowing down that is too pronounced, since the vehicle is braked via both axles VA, HA from time $t_1$. After time $t_1$, the pressure p at the rear axle HA can continuously be increased further if this is desired or necessary.

Diagram II) shows the differential slip s between the front axle VA and the rear axle HA. The differential slip s is a difference, based on the speed of the front axle VA, between the axle speeds v_VA, v_HA of the two vehicle axles VA, HA. The differential slip s can be determined by the formula s=(v_VA−v_HA)/v_VA, wherein v_VA is the speed of the front axle and v_HA is the speed of the rear axle.

The differential slip s increases in diagram II) from time $t_0$, at which the driver of the vehicle 200 initiates the deceleration a, from an actual value $s_0$ measured at that time until it reaches a predefined differential slip threshold value $s_1$. When the differential slip threshold value $s_1$ is reached, the brake circuit BK2 of the front axle VA is automatically activated.

Diagram III) shows a deceleration a of the vehicle 200 over time t, from the start of the deceleration request $t_0$, at which the brakes HAB1, HAB2 of the first vehicle axle HA are activated in order to decelerate the vehicle 200. When a predefined deceleration threshold value $a_1$ is reached at time $t_1$, the second vehicle axle VA, or the brakes VAB1, VAB2 thereof, is/are automatically connected, so that the vehicle 200 is then slowed down at the front axle VA and at the rear axle HA.

FIG. 6 shows three possible criteria, namely the pressure threshold value $p_1$, the differential slip threshold value $s_1$ and the deceleration threshold value $a_1$, which can be used to determine the time at which the VA is connected for the deceleration operation.

Each of these three criteria can be used on its own to determine the time at which, on deceleration of the vehicle 200, the front axle VA is activated in order to assist the rear axle HA, which was initially the only braking axle.

The time $t_1$ at which the front axle VA is connected can, however, also be determined by a combination of the detection of the pressure threshold value $p_1$ and the differential slip threshold value $s_1$ or a combination of the detection of the pressure threshold value $p_1$ with the deceleration threshold value $a_1$ or a combination of the detection of the differential slip threshold value $s_1$ with the deceleration threshold value $a_1$.

Finally, the time $t_1$ at which the front axle VA must automatically be activated in order to slow down the vehicle 200 can be determined from the deceleration threshold value $a_1$ and the differential slip threshold value $s_1$ and the pressure threshold value $p_1$ in combination.

Figure 7:
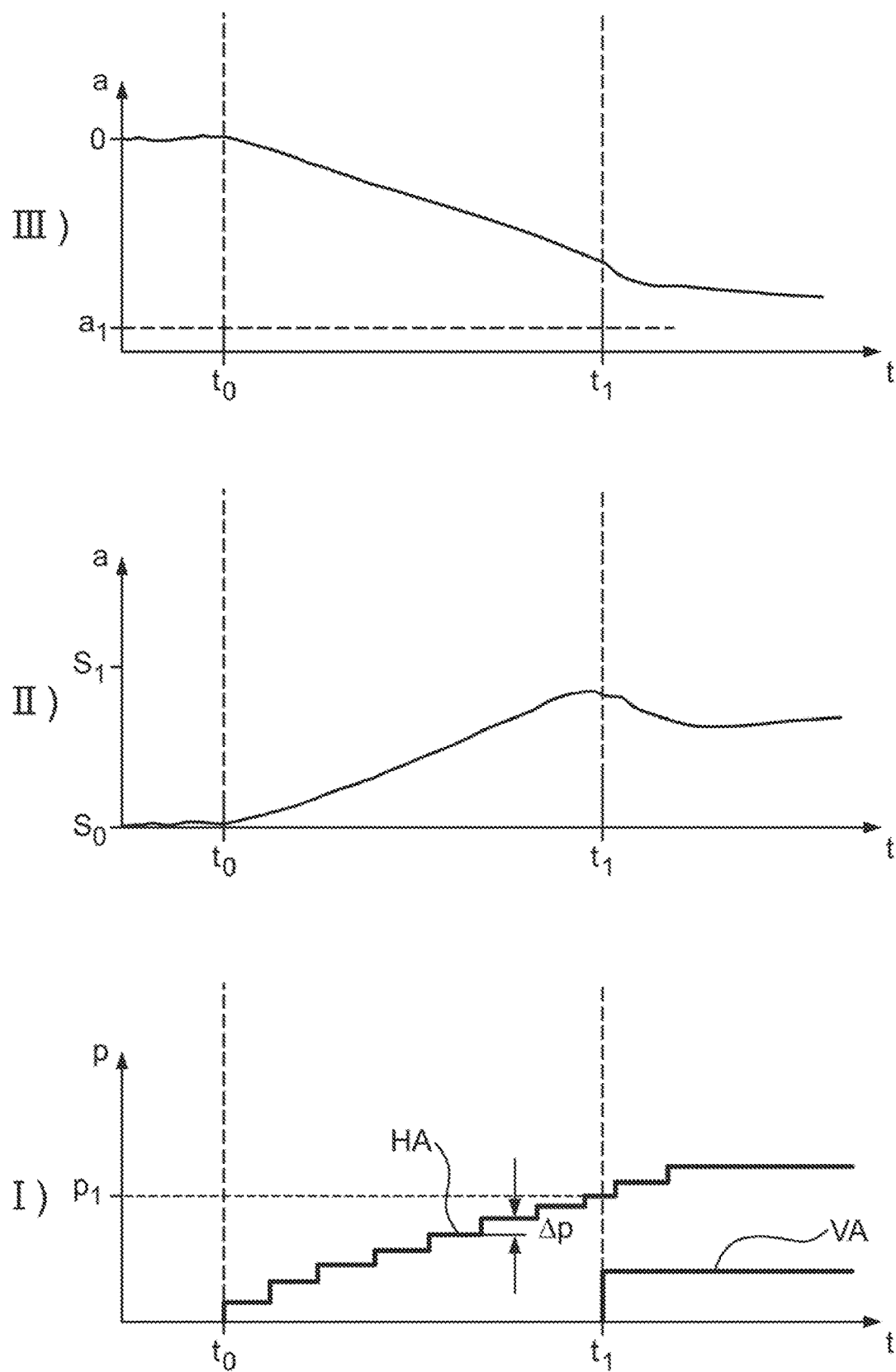

FIG. 7 is based on FIG. 6 but shows a variant thereof. It can best be seen in diagram I) of FIG. 7 that here, unlike in FIG. 6, the brake pressure at the rear axle HA is not reduced when the pressure threshold value $p_1$ is reached. A pressure jump thus occurs. This can be advantageous if, for example, the jump at the front axle VA is only small or the deceleration request is high. This has the result that the deceleration does not reach the deceleration threshold value $a_1$ in diagram III). However, since the differential slip threshold value $s_1$ and the pressure threshold value $p_1$ are reached, the front axle VA is connected.

It is understood that the foregoing description is that of the preferred embodiments of the invention and that various changes and modifications may be made thereto without departing from the spirit and scope of the invention as defined in the appended claims.

LIST OF REFERENCE DESIGNATIONS (PART OF THE DESCRIPTION)

1 control unit (ECU)
4 brake pedal
5 axle modulator
5V1 valve, relay valve
5V2 valve, ABS valve
5V3 valve, solenoid valve
8 electronic stability control system (ESC module)
200 vehicle
202 commercial vehicle
206 braking system
a deceleration
$a_1$ deceleration threshold value
p pressure
$p_1$ pressure threshold value
Δp pressure difference
s differential slip
$s_1$ differential slip threshold value
t time
$t_0$ start of deceleration
$t_1$ connection of VA
A brake pressure profile
ABS2a ABS valve, ABS architecture
ABS2b ABS valve, ABS architecture
B brake pressure profile
B1 brake pressure partial profile
B2 brake pressure partial profile
BK1 brake circuit
BK2 brake circuit
BK3 brake circuit
C brake pressure profile
C1 brake pressure partial profile
C2 brake pressure partial profile
D brake pressure profile
D1 brake pressure partial profile
D2 brake pressure partial profile
FBV foot brake valve
HA rear axle
HAB1 brake
HAB2 brake
HR1 rear wheel
HR2 rear wheel
L1 line system
L11 line section
L12 line section
L13a line section
L13b line section
L2 line system
L21 line section
L22 line section
L23 line section
L24a line section
L24a1 line section
L24b line section
L24b1 line section
MV2 solenoid valve
R1 reservoir
R2 reservoir
RV2 relay valve
S1 control line
S51 control line
S52 control line
S53 control line
SMV2 signal line
SABS2a signal line
SABS2b signal line
VA front axle
VAB1 brake
VAB2 brake
VR1 front wheel
VR2 front wheel
V1 valve

What is claimed is:

1. A method for controlling the deceleration of a vehicle, wherein the vehicle includes a central control unit, a first brake circuit (BK1) for a rear axle (HA) and a second brake circuit (BK2) for a front axle (VA); the method comprising the steps of:

in response to an electronically requested deceleration request (a) below a predetermined deceleration threshold value ($a_1$), activating only the first brake circuit that one of the brake circuits (BK1, BK2) of the rear axle and the front axle, respectively, that permits a gradation in a change of pressure ($\Delta p$) for substantially continuous, jolt-free manipulation of the deceleration via the central control unit; and, causing the activation of that one of the brake circuits (BK1, BK2) to be maintained as long as the predetermined deceleration threshold value ($a_1$) is not exceeded.

2. The method of claim 1, wherein the other one of the axles from the rear axle (HA) and the front axle (VA), whose brake circuit (BK1, BK2) is not connected in the event of the deceleration request (a) below the deceleration threshold value ($a_1$), remains pressure-free.

3. The method of claim 1, wherein the manipulation of the deceleration is controlled at one of the rear axle (HA) and the front axle (VA) via a brake force of an ABS architecture (ABS2$a$, ABS2$b$) and the other of the rear axle (HA) and the front axle (VA) is controlled via a brake force of an axle modulator; and, only the brake circuit (BK1; BK2) of the axle (HA; VA) whose brake force is controlled via the axle modulator is activated by the central control unit.

4. The method of claim 1, wherein the axle (HA; VA) with the finer gradation ($\Delta p$) in the pressure change is activated by the central control unit when the deceleration request (a) lies in a range greater than 0, and in the event of a predefined or predefinable higher deceleration request (a), the brake circuit (BK1; BK2) for the hitherto unbraked axle (HA; VA) is automatically additionally activated by the central control unit.

5. The method of claim 4, wherein the connection of the additional brake circuit (BK1, BK2) takes place in dependence on at least one of the deceleration threshold value ($a_1$) and the pressure threshold value ($p_1$) and the differential slip threshold value ($s_1$).

6. The method of claim 4, wherein a pressure jump that occurs in the additionally activated brake circuit (BK1; BK2) is compensated for by reducing the pressure in the brake circuit (BK1; BK2) having finer gradation ($\Delta p$).

7. The method of claim 3, wherein the manipulation of the deceleration is effected by a brake force at the rear axle (HA) by the axle modulator.

8. A braking system for a vehicle comprising:
a central control unit;
an actuating element for the braking system having a brake valve (FBV);
a first brake circuit (BK1) for a rear axle (HA); and,
a second brake circuit (BK2) for a front axle (VA);
said central control unit, in dependence upon at least one of the following:
   (i) a traveling speed of the vehicle; and,
   (ii) a deceleration request (a) by an electronic request for deceleration (XBR);
being configured to activate and control only that one of said brake circuits (BK1, BK2) from said first and second brake circuits (BK1, BK2) that has a gradation in a change of pressure ($\Delta p$) for substantially continuous, jolt-fee manipulation of said deceleration (a);
wherein said first brake circuit (BK1) or said second brake circuit (BK2) comprises an ABS architecture (ABS2$a$, ABS2$b$) and the other brake circuit (BK2, BK1), comprises an axle modulator; and, said central control unit connects only the brake circuit (BK1, BK2) of the axle (HA; VA) whose deceleration is controllable via a brake force of the axle modulator.

9. A braking system for a vehicle comprising:
a central control unit;
an actuating element for the braking system having a brake valve (FBV);
a rear brake circuit (BK1) for a rear axle (HA); and,
a front brake circuit (BK2) for a front axle (VA);
   wherein a first brake circuit of said rear brake circuit (BK1) and said front brake circuit (BK2) permits a finer gradation in a change of pressure ($\Delta p$) for substantially continuous, jolt-free manipulation of the deceleration via the central control unit than a second of the rear brake circuit (BK1) and the front brake circuit (BK2);
said central control unit, in dependence upon at least one of the following:
   (i) a traveling speed of the vehicle; and,
   (ii) a deceleration request (a) by an electronic request for deceleration (XBR);
being configured to activate and control only said first brake circuit; and,
wherein a maximum permissible deceleration request (a) in the event of which only said first brake circuit is activated lies in the range between 0 m/sec$^2$ and 2 m/sec$^2$; and, when the maximum permissible deceleration request (a) is exceeded, said central control unit automatically additionally activates the brake circuit (BK1; BK2) with an ABS architecture (ABS2$a$, ABS2$b$).

* * * * *